Nov. 9, 1971　　　G. M. CRANDALL　　　3,618,273
BUILDING CONSTRUCTION

Filed July 2, 1969　　　　　　　　　　　2 Sheets-Sheet 1

George M. Crandall
INVENTOR
BY Kolisch & Hartwell
Attys.

George M. Crandall
INVENTOR
BY Kolisch & Hartwell
Attys.

United States Patent Office 3,618,273
Patented Nov. 9, 1971

3,618,273
BUILDING CONSTRUCTION
George M. Crandall, Portland, Oreg., assignor to
Geonetics, Inc., Portland, Oreg.
Filed July 2, 1969, Ser. No. 838,427
Int. Cl. E04h 1/12, 9/06
U.S. Cl. 52—79    13 Claims

ABSTRACT OF THE DISCLOSURE

A building including elongated structural members joined to one another to form a lattice structure defining interconnected and adjoining tetrahedral frames. Modular space enclosures are supported on the lattice structure. The tetrahedral frames are disposed in multiple levels. A first series of enclosures are supported on one level of frames while a second series of enclosures are supported on a higher level of frames. The enclosures may be substantially spherical and the lower extremities of the enclosures in the second series nest between the upper extremities of the enclosures in the first series.

This invention relates to a building, and more particularly, to a building including a lattice structure with modular space enclosures supported thereon.

Presently the supply of new housing and other buildings is unable to keep pace with the demand for such. Various prefabricated constructions have been tried in an attempt to alleviate this problem. For the most part, however, these have been only slight variations from and improvements over conventional constructions completed at the building site.

The invention presented herein contemplates a radical departure from and a unique improvement over existing building constructions. The building contemplated by the invention includes a lattice structure formed of multiple elongated structural members which are joined to each other adjacent their ends to define multiple tetrahedral frames. Modular space enclosures are supported on the lattice structure. All parts of the building are capable of being manufactured at a central plant remote from a building site, and then of being transported to and quickly and economically assembled at the building site.

A general object of the invention is to provide a novel building which may be quickly and economically manufactured and assembled.

Another object is to provide a building wherein elongated structural members are joined to each other to form a supporting lattice structure of interconnected tetrahedral frames. The lattice structure is rigid, and will withstand substantial loading, both in vertical and lateral directions.

Still another object is to provide a novel building wherein modular space enclosures are disposed at multiple levels in a supporting lattice structure. The enclosures are shaped so that the lower extremity of an enclosure at one level nests between the upper extremities of enclosures at a lower level, whereby a compact and esthetically pleasing structure is produced.

Yet another object of the invention is to provide a building that makes use of substantially spherical modular space enclosures supported on a lattice supporting structure. The substantially spherical configuration of each enclosure permits it to seat within the lattice structure. The enclosure provides a substantial amount of enclosed space. The configuration contemplated has valuable aerodynamic qualities, in that it decreases wind load which must be resisted by the lattice support structure.

These and other objects and advantages will become more fully apparent as the following description is read in conjunction with the drawings, wherein.

Figures 1, 4:
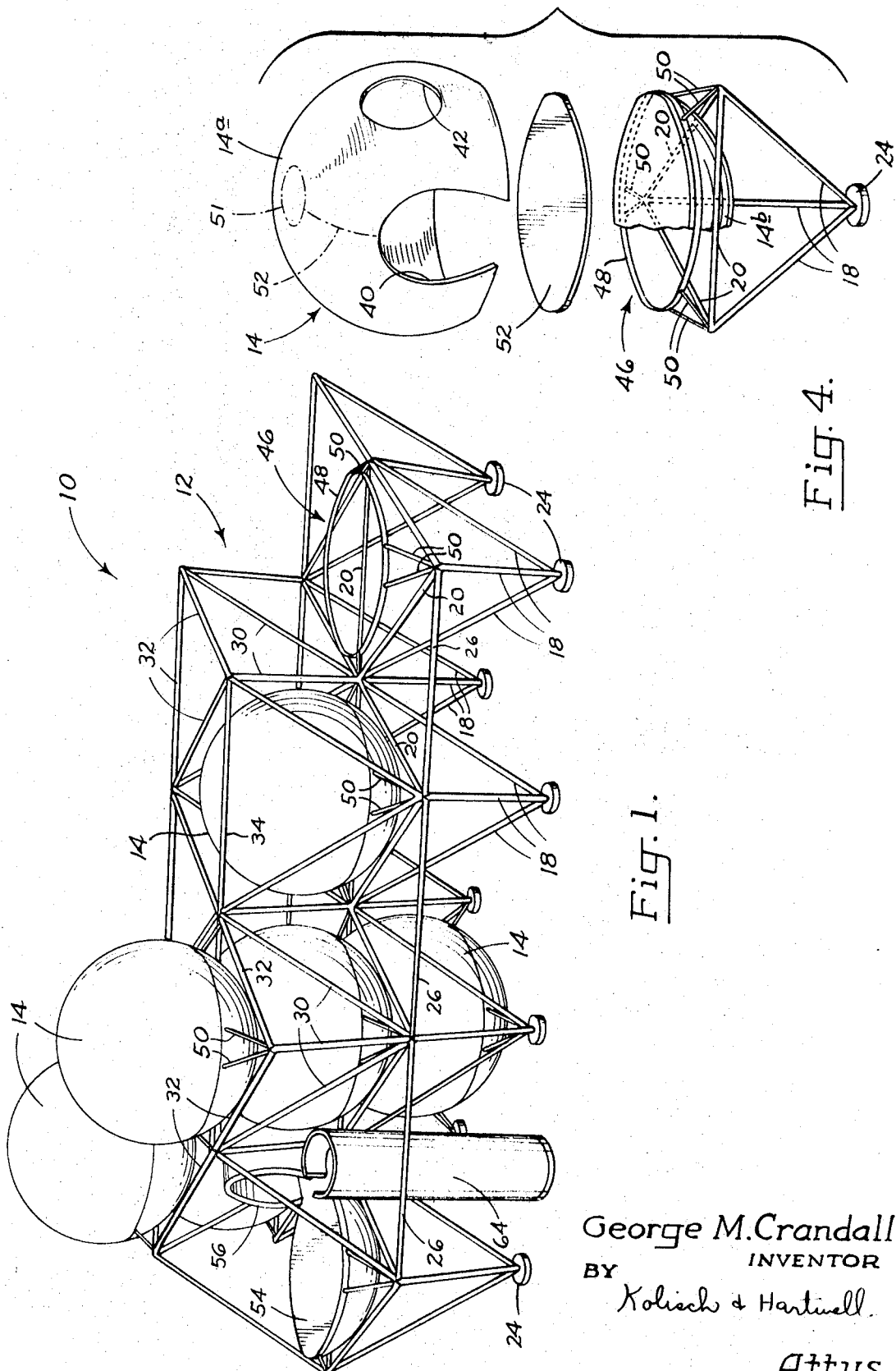
FIG. 1 is a perspective view of portions of a building constructed in accordance with an embodiment of the invention.
FIG. 4 is a perspective, exploded view of a single tetrahedral frame with an enclosure supported thereon.
Figure 2:
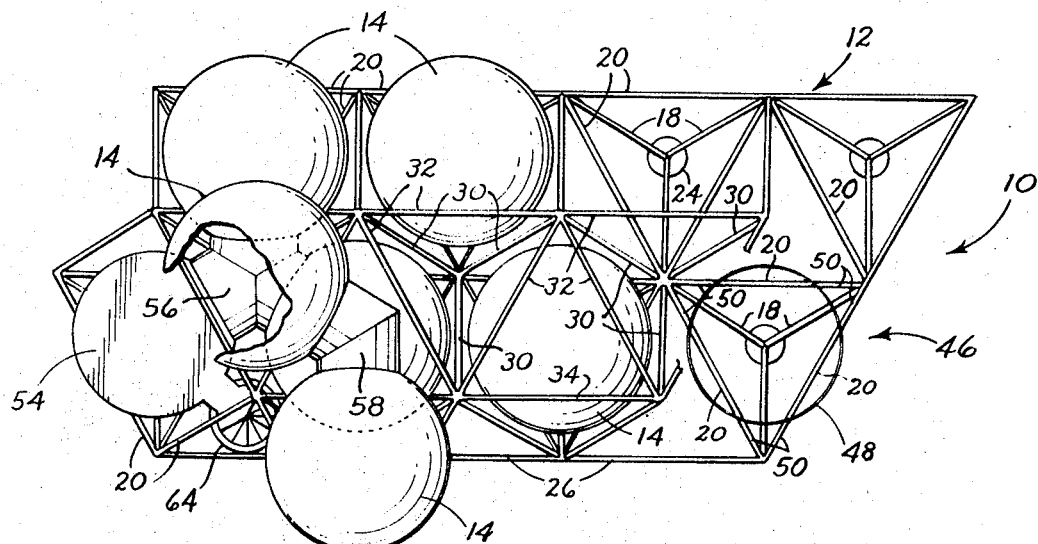
FIG. 2 is a top plan view, somewhat reduced in scale, of the building illustrated in FIG. 1.
Figure 3:
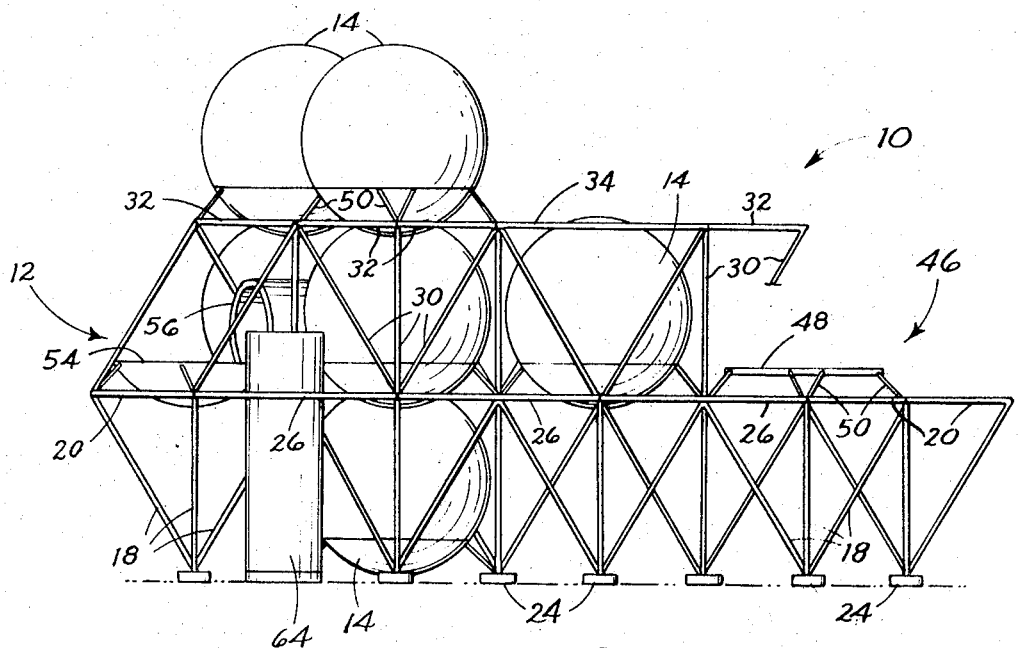
FIG. 3 is a front elevation view, somewhat reduced in scale, of the building illustrated in FIG. 1.

Referring now to the drawings, and specifically to FIGS. 1, 2, and 3, at 10 is indicated a building as contemplated by the invention. In broad terms, the building comprises a supporting lattice structure indicated generally at 12 upon which are supported multiple modular space enclosures 14.

Lattice structure 12, as illustrated in FIG. 3, comprises two levels, or tiers of what are referred to herein as tetrahedral frames. Considering the lower level, or tiers, such is made up of a multiplicity of inclined, elongated structural members 18 and substantially horizontal elongated structural members 20. Members 18, 20 are joined to one another adjacent their ends to form a series of interconnected and adjoining tetrahedral frames. The particular method of joining is unimportant as they may be bolted together, welded, or joined in any other suitable manner. There are three horizontal members 20 and three inclined members 18 making up each tetrahedral frame.

Members 20 in each frame are arranged as a triangle, and form a substantially horizontal upper side with three corners or vertices in such side. The upper sides of the tetrahedral frames making up the lower level of frames occupy a substantially common plane. The vertices of adjacent upper sides are joined together. Members 18 in each frame depend from members 20 where members 20 form a vertex, and converge to join at a point, or vertex, spaced below members 20. The lower ends of members 18 are secured to foundation footings 24 which rest on and anchor the structure to the ground.

Around the perimeter of the lower level of frames, additional elongated structural members 26 are included which join the outer corners of the upper sides of the tetrahedral frames. In this way, greater rigidity is imparted to the lattice structure.

The upper level, or tier, of tetrahedral frames illustrated in the figures is constructed similarly to the lower level. Thus, a series of tetrahedral frames are formed from horizontal structural members 32, resembling members 20, and inclined members 30, resembling members 18. Inclined embers 30 in each frame depend from horizontal members 32 and converge on each other progressing downwardly from members 32. Members 30 in each frame are joined together at a vertex at their bottom set of ends. The bottom set of ends in a frame are joined to the frames in the lower level where members 20 form a corner.

Horizontal members 34 at the perimeter of the upper level of frames interconnect spaced corners or vertices of the upper sides formed by members 32, and correspond to previously described members 26.

Another way of viewing the structure is that selected ones of the structural members forming adjacent tetrahedral frames also bound octahedral regions within the structure. The members which bound octahedral regions in the structure illustrated are those that surround space enclosures 14 on the second, or intermedite, level of this structure. Such an octahedral region is bounded on its lower side by a trio of members 20 connected to each other to form a triangle, and is bounded on its upper side by a trio of members 32 connected to each other to form a triangle over the previously-mentioned lower side. Inclined members 30 extending between corners formed by members 20 which bound a lower side for the octahedral region and corners formed by members 32 which bound the upper side of the octahedral region bound inclined sides of the octahedral region.

The structural members forming the frames in both the first and second series of frames all have substantially equal lengths. Thus, substantially regular tetrahedral frames are formed throughout the structure, and these frames have equilateral triangular sides.

Referring still to FIG. 2, it will be seen that the tetrahedral frames in the upper level are positioned, or staggered, with respect to the lower level of frames so that the vertices, or corners, of the sides formed by horizontal members 32 are centered over triangles formed by members 20 and 26. The centers of the upper sides of the upper level of frames are offset from the centers of the upper sides of the frames in the lower level.

In mounting an enclosure on the lattic structure, an anchor frame may be employed, which is perhaps best illustrated in FIGS. 1 and 4. The anchor frame, indicated generally at 46, includes a horizontal, rigid ring 48 which is mounted on the upper side of a tetrahedral frame by three sets of inclined, V-shaped brackets 50. The brackets support the ring in a position somewhat elevated from the tetrahedral frame. Lower extremities of the brackets are joined to the vertices of the upper side of the frame.

In the particular embodiment of the invention illustrated, each space enclosure 14 is substantially spherical. An enclosure may be made as illustrated in FIG. 4, from two sections comprising lower section or dome 14b (the minor part of a sphere) and upper section or dome 14a (the major part of a sphere).

In mounting an enclosure in place, and referring to FIG. 4, lower section 14b may be fastened in a suitable manner to ring 48 and depending from the ring. A floor may be included, such as floor 52 shown in FIG. 4, and such may be secured to the ring, with the floor extending between the sides of the ring. To complete the enclosure, upper section 14a is secured to the ring with such extending over the floor. The ring adds rigidity to the enclosure and through the ring the enclosure becomes rigidly anchored to the lattice structure.

The enclosure may be made of any suitable material. Thus, the domes or sections may be manufactured as thin shells of fiberglass. To their interiors, a layer of insulation material, such as polyurethane foam may be applied at the construction site. This layer not only insulates, but adds rigidity. To facilitate shipping an enclosure section, it is contemplated that a relief hole may be formed at the apex of the section, such as is illustrated by dotted line 51 in FIG. 4, and that a cut extending from such relief hole to an edge of the section be prepared, such as is illustrated by dotted line 52. The cut and relief hole would permit the section to be rolled up on itself, to reduce greatly its bulk for shipping. It could then be unrolled at the job site, with the cut line and relief hole than being filled.

Apertures, such as those indicated at 40, 42, may be formed in upper section 14a, for doorway connections and windows, respectively.

Referring to FIG. 1, a porch may be formed in the structure by flooring over the ring in an anchor frame, as shown at 54.

As is best seen in FIG. 3, in the building illustrated a single enclosure is supported in the structure at ground level. In mounting this enclosure, a ring is employed with such ring supported on brackets having their lower ends secured to footings 24. A series of multiple enclosures are supported over horizontal members 20, and another series of multiple enclosures are supported over horizontal members 32, of the upper level of tetrahedral frames. Each enclosure is seated substantially centrally of the three horizontal members forming the upper side of a tetrahedral frame. Further, the enclosures supported within the previously described octahedral regions are seated substantially centrally of those horizontal members which bound the lower sides of such octahedral regions. With the enclosures being spherical, and having reduced upper and lower extremities, the bottoms of enclosures in an upper series of enclosures are able to extend downwardly between, and thus nest between, the upper extremities of enclosures below.

Referring specifically to FIG. 2, enclosed passageways such as those indicated at 56, 58 may be provided to interconnect the interiors of adjacent enclosures. Passageway 56 includes three legs, with one leg being connected to a doorway aperture in an enclosure, another leg being connected to such an aperture in an adjacent enclosure, and the third leg opening onto porch 54. Passageway 58 is somewhat similar, but has only two legs, for interconnecting the interiors of two adjacent enclosures.

A stairway enclosed in cylinder 64 provides access from ground level to elevated enclosures in the structure.

Although the building illustrated comprises substantially spherical enclosures and structural members of equal length forming regular tetrahedral frames, it should be obvious to one skilled in the art that members of unequal length may be used to form irregular tetrahedral frames if desired, and also enclosures other than spherical may be used without departing from the invention.

It is claimed and desired to secure by Letters Patent:

1. A building comprising:
    multiple elongated structural members joined to one another adjacent their ends to form a supporting lattice structure; said members forming in the structure stacked tiers of interconnected adjacent tetrahedral frames; the frames in at least one tier including upper substantially horizontal sides occupying substantially a common plane, and each frame in said one tier including inclined downwardly converging members that come together at a vertex; the frames in a tier above said one tier including upper substantially horizontal sides occupying substantially a common plane, and each frame in said second-mentioned tier including inclined downwardly converging members that come together at a vertex; the tetrahedral frames of said second-mentioned tier being staggered with respect to the frames of said one tier and having vertices supported at corners of the horizontal sides in said one tier; with adjacent tetrahedral frames in said second-mentioned tier bounding an octahedral region therebetween.
    an enclosure supported within an octahedral region bounded by adjacent tetrahedral frames in said second-mentioned tier; and another enclosure supported on a frame of said second-mentioned tier with such centered over a horizontal side of a frame in said second-mentioned tier.

2. The building of claim 1, wherein an enclosure is substantially spherical and is separable into upper and lower portions along a substantially horizontal plane and said anchor frame comprises a substantially horizontal ring to which the enclosure is secured with the lower portion of the enclosure depending from the ring and the upper portion of the enclosure extending upwardly from the ring.

3. The building of claim 1, wherein the lower extremity of said other enclosure occupies a horizontal plane which is at a lower elevation than the upper extremity of said first-mentioned enclosure.

4. The building of claim 3, wherein said enclosures are substantially spherical.

5. The building of claim 1, which further comprises an anchor frame secured to an enclosure and to said lattice structure to support and anchor the enclosure on said lattice structure.

6. A building comprising:
multiple elongated structural members joined to one another adjacent their ends to form a supporting lattice structure, said members forming in the structure stacked tiers of interconnected tetrahedral frames; adjacent tetrahedral frames in one tier bounding on octahedral region therebetween, with a trio of substantially horizontal members occupying a substantially common plane joined to each other adjacent their ends to form a triangle bounding a substantially horizontal triangular lower side for said octahedral region; and a space enclosure supported within said octahedral region over said lower triangular side.

7. The building of claim 6, wherein said enclosure is supported in a first tier of tetrahedral frames in said lattice structure, and which further comprises another enclosure supported in another tier of frames in said structure above said first tier, with the lower extremity of said other enclosure occupying a horizontal plane which is at a lower elevation than the other extremity of said first-mentioned enclosure.

8. The building of claim 6, wherein said enclosure is substantially spherical.

9. The building of claim 6, which further comprises an anchor frame secured to the enclosure and to said lattice structure to support and anchor the enclosure on the lattice structure.

10. The building of claim 9, wherein the enclosure is substantially spherical and is separable into upper and lower portions along a substantially horizontal plane and said anchor frame comprises a substantially horizontal ring to which the enclosure is secured with the lower portion of the enclosure depending from the ring and the upper part of the enclosure extending upwardly from the ring.

11. A building comprising multiple elongated structural members joined to one another adjacent their ends to form a supporting lattice structure; said members forming in the structure interconnected tetrahedral frames; said frames including upper substantially horizontal sides occupying substantially a common plane, and each frame including inclined downwardly converging members that come together at a vertex; lower substantially horizontal elongated structural members interconnected adjacent their ends to form triangles, with a corner of each triangle being connected at the vertex of the downwardly converging members of a tetrahedral frame; with adjacent tetrahedral frames bounding on octahedral region therebetween, and with a trio of said lower structural members arranged in a triangle bounding a triangular lower side of said octahedral region; and a space enclosure supported within said octahedral region over said triangular lower side.

12. The building of claim 11, wherein said enclosure is substantially spherical.

13. The building of claim 11, wherein the enclosure is substantially spherical and is separable into upper and lower portions along a substantially horizontal plane and which further comprises a substantially horizontal anchor ring secured to the lattice structure to which ring the enclosure is secured with the lower portion of the enclosure depending from the ring and the upper portion of the enclosure extending upwardly from the ring.

References Cited

UNITED STATES PATENTS

| | | | |
|---|---|---|---|
| 1,353,770 | 9/1920 | McWilliams | 52—382 |
| 3,220,152 | 11/1965 | Sturm | 52—81 |
| 3,363,370 | 1/1968 | Camoletti | 52—80 |
| 3,388,512 | 6/1968 | Newman | 52—80 |
| 3,411,250 | 11/1968 | Maymont | 52—81 |
| 3,412,519 | 11/1968 | Brettingen | 52—81 |
| 3,468,083 | 9/1969 | Camoletti | 52—81 |

FOREIGN PATENTS

| | | | |
|---|---|---|---|
| 34,196 | 1934 | Netherlands | 52—382 |
| 648,074 | 1962 | Italy | 52—615 |
| 1,104,068 | 2/1968 | Great Britain | 52—79 |

OTHER REFERENCES

Space Grid Structures by John Borrego, pp. 80–83, 86, 87, 102, 103, and 104.

FRANK L. ABBOTT, Primary Examiner

H. C. SUTHERLAND, Assistant Examiner

U.S. Cl. X.R.

52—80, 236, 237, 648